(No Model.)
C. J. FORSMAN.
AXLE BEARING FOR VEHICLES.
No. 270,214. Patented Jan. 9, 1883.
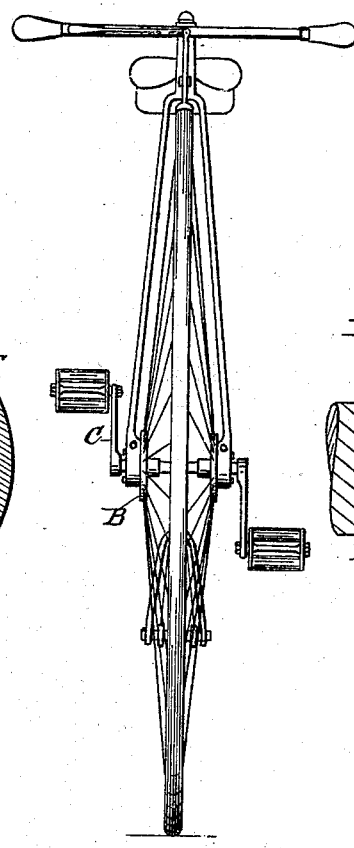
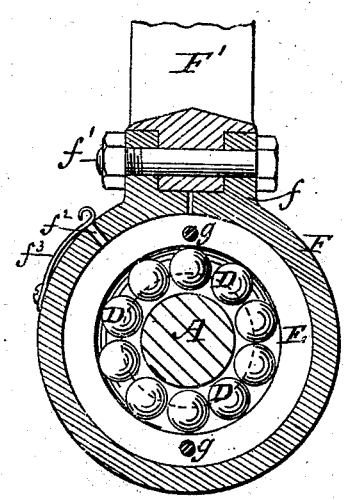
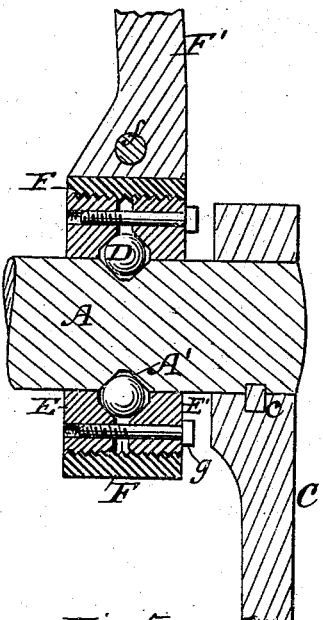
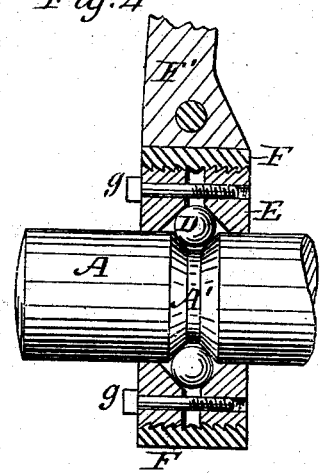
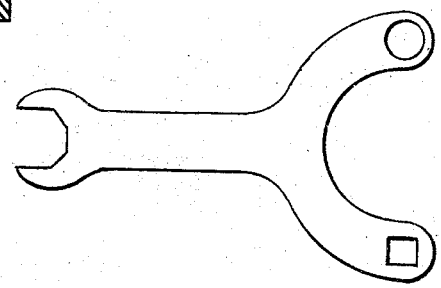
Witnesses:
W. B. Masson
L. C. Hills
Inventor:
Calvin J. Forsman
by E. E. Masson
atty.

UNITED STATES PATENT OFFICE.

CALVIN J. FORSMAN, OF COLUMBUS, OHIO.

AXLE-BEARING FOR VEHICLES.

SPECIFICATION forming part of Letters Patent No. 270,214, dated January 9, 1883.

Application filed November 14, 1882. (No model.)

*To all whom it may concern:*

Be it known that I, CALVIN J. FORSMAN, a citizen of the United States, residing at Columbus, in the county of Franklin and State of Ohio, have invented certain new and useful Improvements in Axle-Bearings for Vehicle-Wheels, of which the following is a specification.

My invention relates to improvements in anti-friction bearings for bicycles and other wheels; and the objects of my improvements are to provide bearings capable of adjustment to compensate for any wear of the bearing parts, and to make these parts and their joints as few as possible. I attain these objects by the construction illustrated in the accompanying drawings, in which—

Figure 1 represents a front view of a bicycle having my improvements. Fig. 2 is a transverse vertical section of one of the axle-bearings. Fig. 3 is a longitudinal vertical section of the same. Fig. 4 is a modification of the same, showing a screw-thread of a different form. Fig. 5 is a side view of the axle-bearings, showing the right and left hand threads cut upon their peripheries. Fig. 6 is a front view of the wrench used to adjust said bearings.

Similar letters refer to similar parts throughout the several views.

In the drawings, A represents the axle, B the wheel-hub, and C the cranks, of a bicycle. Each crank is secured to one end of the axle by a key, $c$, or other suitable means, so that the two shall turn together. Within the periphery of the axle, and adjoining the ends thereof, are cut V-shaped annular grooves A', to receive a row of small hardened steel balls, D, that are retained in position within said grooves by the bearing-boxes E and E', adjustably secured within a ring, F, attached to each branch of the front fork, F', of a bicycle, the ring F having lugs $f$, adapted to rest against the sides of the perforated ends of said fork, and being also perforated to receive the retaining-bolt $f'$. The interior of the ring F is screw-threaded with different threads for each half of its length, one end having a right-hand thread and the other end a left-hand thread, the bearing-boxes E and E' having their surface threaded correspondingly. These boxes have holes to receive small bolts $g$, by which they are united and can be turned together, the holes in the box E being screw-threaded to engage with the thread upon said bolts, while the holes in the box E' are left smooth. The right and left hand threads cut upon the periphery of the boxes E and E' may be ordinary thread, as shown in Fig. 3, or a ratchet-thread, as shown in Fig. 4. The bearing-ring F is provided with an oil-hole, $f^2$, opposite the row of balls, and this hole is closed by a spring-cap, $f^3$, secured to said ring.

To unite the wheel to its axle and bearings, said wheel is laid flat upon its side, and the fork F', with its inner bearings, E, secured to the end thereof, is made to straddle the wheel. The axle is then passed through said bearings, and a series of hardened steel balls is introduced in the cavity of said bearing, between it and the groove in the axle. The bearing E' is then screwed until nearly brought to a bearing over said balls. The bolts $g$ are then used to connect the bearings E and E', said bearings are rotated together, and their right and left hand threads bring them to bear uniformly on both sides of the balls. Each bolt $g$ is then given a portion of a turn to rigidly clamp the bearing-surfaces of the thread (upon the periphery of the bearings E E') against the internal thread of the ring F. The operation is repeated for the opposite end of the axle, and the cranks are then secured to the ends thereof.

I am aware that various forms of ball-bearings have been used, and that they have been constructed so as to be adjustable for wear by having the bearing-box made in two parts adapted to approach each other, and I do not claim, broadly, adjustable ball-bearings.

What I claim as my invention is—

1. The combination of the axle provided with annular grooves A', with bearings E and E', provided with annular recesses, and bolts $g$, uniting said bearings, with a series of balls adapted to rest within the annular groove of the axle and between the annular recesses of said bearings, substantially as and for the purpose described.

2. The combination of a bicycle-fork, F, having its end rings screw-threaded internally, and the axle provided with annular grooves, with the bearings E and E', provided with screw-threads upon their peripheries, and annular recesses, and a series of balls adapted to enter the grooves upon the axle, substantially as and for the purpose described.

3. The combination of a bicycle-fork having its cylindrical ends screw-threaded internally, and the axle provided with annular grooves, with a series of balls entering said grooves, bearings E and E', having their peripheries provided with a right and a left hand screw, and connecting-bolts $g$, substantially as and for the purpose described.

CALVIN J. FORSMAN.

Witnesses:
C. C. SHEPHERD,
S. T. NEEDELS.